United States Patent [19]

Van Tulleken et al.

[11] Patent Number: 4,983,813
[45] Date of Patent: Jan. 8, 1991

[54] SUBMERSIBLE AQUARIUM HEATER WITH ADJUSTABLE ELECTRONIC THERMOSTATIC CONTROL

[75] Inventors: Anthony Van Tulleken, London; David Johnson, Harts, both of United Kingdom

[73] Assignee: Interpet Ltd., Surrey, England

[21] Appl. No.: 362,169

[22] Filed: Jun. 6, 1989

[51] Int. Cl.$^5$ .................... H05B 1/02; H05B 3/80; A01K 63/06
[52] U.S. Cl. .................... 219/523; 219/506; 219/534; 392/498
[58] Field of Search ............... 219/523, 534, 331, 328, 219/335, 336, 506

[56] References Cited

U.S. PATENT DOCUMENTS

| | | | |
|---|---|---|---|
| 3,560,707 | 2/1971 | Kolfertz | 219/523 X |
| 3,896,289 | 7/1975 | Di Renna | 219/523 |
| 4,124,793 | 11/1978 | Colman | 219/523 |
| 4,327,281 | 4/1982 | Jager et al. | 219/523 |
| 4,812,626 | 3/1989 | Strada | 219/523 |

FOREIGN PATENT DOCUMENTS

| | | | |
|---|---|---|---|
| 2334170 | 1/1975 | Fed. Rep. of Germany | 219/523 |
| 2554237 | 6/1977 | Fed. Rep. of Germany | 219/523 |
| 2074825 | 11/1981 | United Kingdom | 219/523 |

*Primary Examiner*—Anthony Bartis
*Attorney, Agent, or Firm*—Helfgott & Karas

[57] ABSTRACT

A submersible electric aquarium heater includes an open-ended glass tube enclosing an electric resistance heater carried by an axially disposed former. First and second bungs seal the ends of the tube. A printed circuit board carrying an adjustable electronic thermostat is positioned in the tube by first and second locators each including an annular spacer engageable with the tube and a centering post. The centering post of the first locator is insertable within the first bung, while that of the other is fixedly inserted into an end for the axially disposed former. The temperature setting of the thermostat is adjusted by a device mounted for rotation in the tube by the first bung and first locator and including a drum provided with indicia visible through the tube wall to indicate the set temperature.

14 Claims, 2 Drawing Sheets

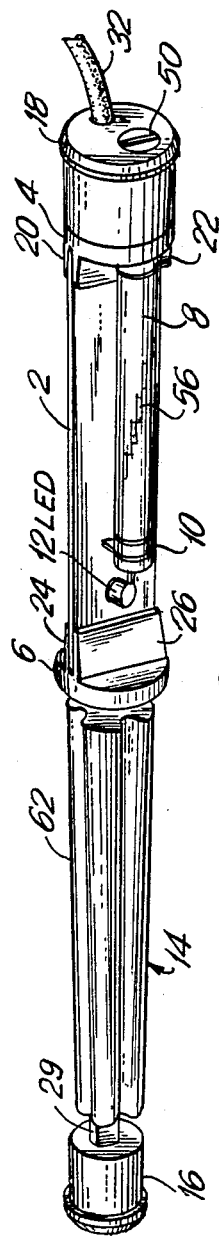
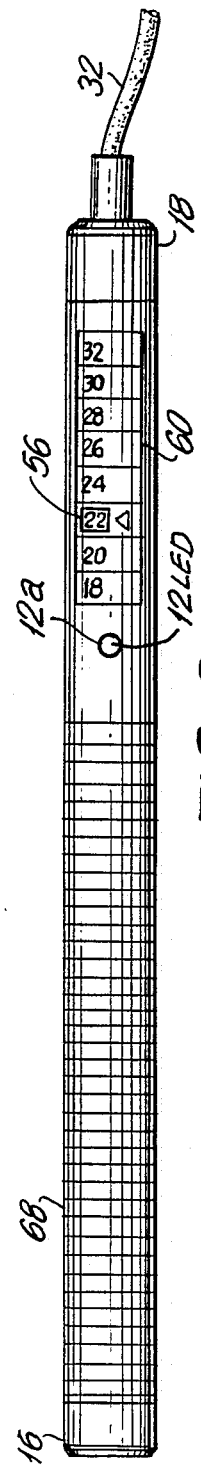
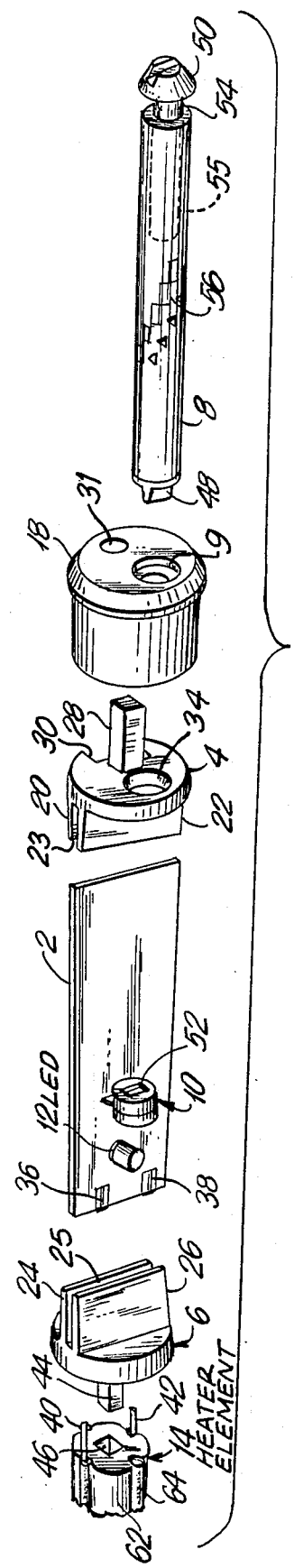
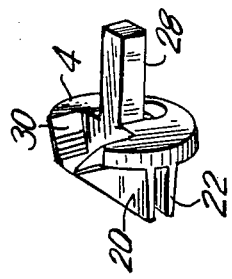
FIG. 1
FIG. 2
FIG. 3A
FIG. 3B

SUBMERSIBLE AQUARIUM HEATER WITH ADJUSTABLE ELECTRONIC THERMOSTATIC CONTROL

BACKGROUND OF THE INVENTION

This invention relates to thermostatic heater apparatus and more particularly to submersible thermostatic heater apparatus employing an electronic thermostat.

Thermostatic heater apparatus intended for aquarium applications normally take the form of an electrical resistance heater controlled by a thermostat. The electrical resistance heater typically is configured as a resistance wound on a ceramic or glass former where the resistance winding per se takes the form of a coil sitting in a threaded groove in the ceramic former, or a coil mounted within a longitudinal groove. Other variations include a coil of wire held in glass tubes or straight lengths of wire disposed on a glass tube or other support.

Many forms of thermostatic heater apparatus utilized for aquarium applications employ bimetal elements for the thermostats since this form of thermostat tends to be significantly less expensive. However, a difficulty encountered in using bimetal elements in these applications tends to be that the same are highly accurate only at the calibration temperature thereof while displaying marked deficiencies through the remainder of the adjustable range. In addition electrical contacts actuated by the bimetal elements are prone to fusing after extended periods of use.

In form, the thermostatic heater apparatus heater apparatus utilized for aquarium applications may comprise an integrated unit wherein a glass tube includes both the heater element and the thermostat. Combined units of this type are often submersible; however, sensing temperature and heating through the glass side or base of the aquarium in non-submersible units is often utilized. A typical example of a submersible, combined unit is disclosed in European patent application No. 0228521 published July 15, 1987.

Alternatively, separate thermostat and heater configurations may be employed. In such separate units, the heaters are typically provided encased in glass or metal tubes for submersion in the aquarium, or as pads which are placed externally under or at the sides of the aquarium tank. With an independent heater, a separate thermostat which is submersible or is external and senses temperature through the glass is typically employed. The separate thermostat frequently employs a dial-like indicating device for indicating temperature and/or providing adjustment. Such indicating arrangements tend not to have substantial visual appeal and are often regarded as unsightly. This is a distinct disadvantage since frequently, a major purpose of an aquarium is a visually appealing display.

Therefore, it is a principal object of this invention to provide improved submersible thermostatic heater apparatus manifesting highly accurately operation throughout an adjustable range, a pleasing appearance and a combined design.

Various other objects and advantages of the present invention will become clear from the following description of an exemplary embodiment thereof and the novel features will be particularly pointed out in conjunction with the claims appended hereto.

SUMMARY OF THE INVENTION

In accordance with the teachings of the present invention submersible thermostatic heater apparatus is provided wherein an electric resistance heater and an adjustable electronic thermostat are combined within a glass tube; the electronic thermostat is provided with a printed circuit board having temperature adjusting means thereon which is controlled by the position of an indicating drum having temperature indicia thereon; the glass tube is sealed by means allowing the indicating drum to be adjusted in position enabling both control of the electronic thermostat and the display of the temperature selected. A waterproof envelope surrounds the printed circuit board, the electronic thermostat, the temperature setting device and the electric resistance heater. The electric resistance heater includes an axially disposed former. The waterproof envelope is a tube having open ends. Two bungs for sealing each end of said tube are provided. Two locators are provided for receiving and retaining the printed circuit board, and annular spacers are provided for positioning the printed circuit board within the tube. Each locator includes centering post means. The centering post means on one of the locator means is insertable within one of the sealing bungs to position the printed circuit board with respect thereto and the centering post means on another locator means is fixed in position with respect to the axially disposed former to position the axially disposed former with respect to the printed circuit board.

BRIEF DESCRIPTION OF THE DRAWINGS

The invention will be more clearly understood by reference to the following detailed description of an exemplary embodiment thereof in conjunction with the accompanying drawings in which:

FIG. 1 is a pictorial view showing the details of an exemplary embodiment of the thermostatic heater apparatus in accordance with the teachings of the present invention;

FIG. 2 is a front pictorial view of the exemplary thermostatic heater apparatus shown in FIG. 1 enclosed within a glass tube detailed in a manner such that only selected areas are displayable;

FIGS. 3A and 3B are pictorial views illustrating the construction details of the embodiment of the invention illustrated in FIG. 1 wherein FIG. 3A is an exploded, partial view showing the cooperative relationship among elements and FIG. 3B is a detailed view of a printed circuit board locator present within the embodiment of the invention illustrated in FIG. 1.

DETAILED DESCRIPTION

Figure 4:
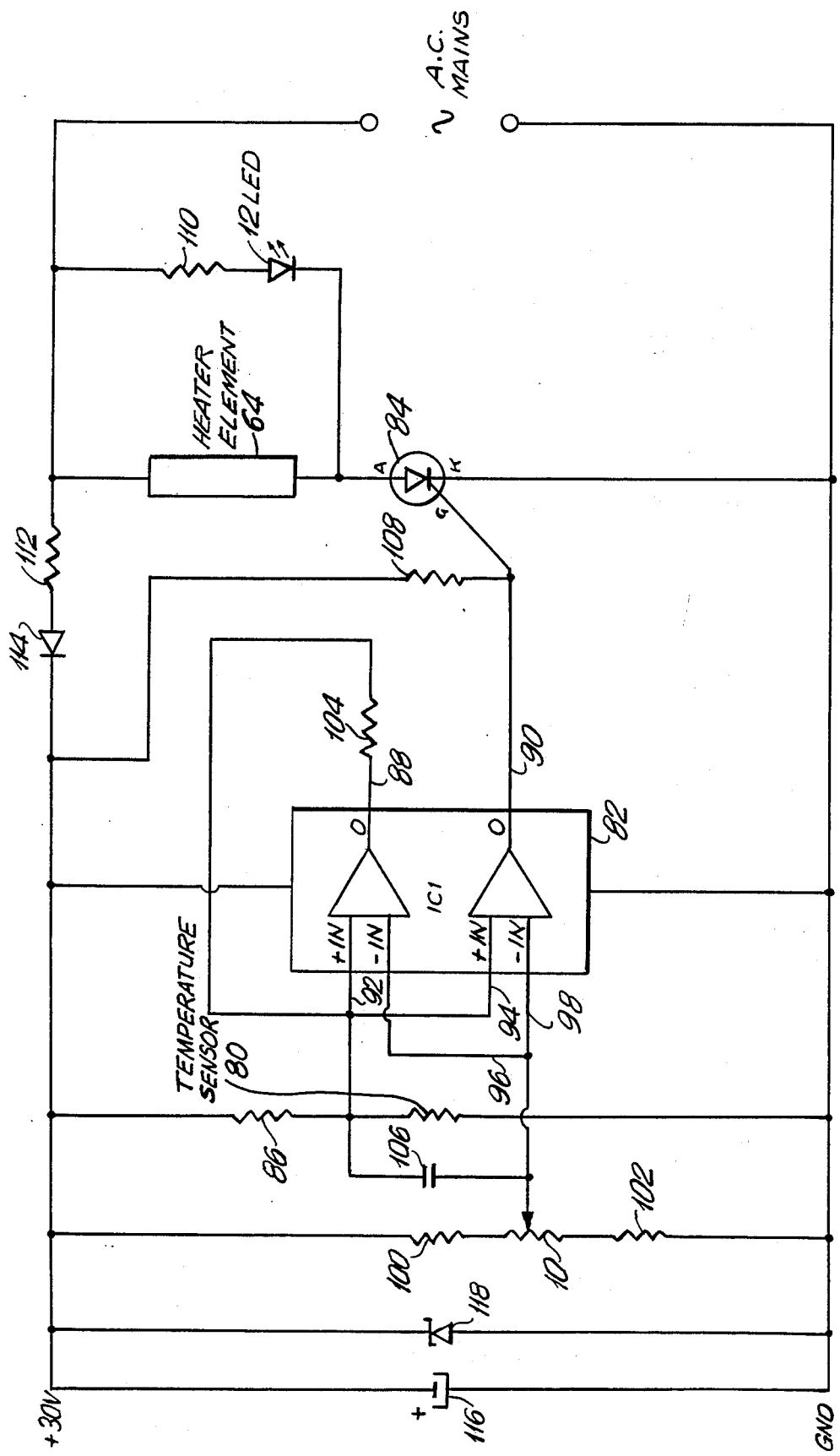
FIG. 4 is a schematic diagram of an exemplary embodiment of an electronic thermostat and heater control circuit for the embodiment of the thermostatic heater apparatus illustrated in FIG. 1.

Referring now to the drawings and more particularly to FIG. 1 thereof, there is shown a pictorial view illustrating the details of an exemplary embodiment of thermostatic heater apparatus in accordance with the teachings of the present inventions. While not illustrated in FIG. 1 the thermostatic heater apparatus depicted is encased within a glass tube 68 both ends of which are opened so that ease of fabrication as well as a fully submersible structure is achieved. Alternatively a glass tube opened at only one end could be employed.

The embodiment of the submersible thermostatic heater apparatus illustrated in FIG. 1 comprises a printed circuit board 2, first and second printed circuit board locators 4 and 6, an indicator drum 8, potentiometer 10, LED 12, electric resistance heater means 14, and sealing bungs 16 and 18. The printed circuit board 2 may taken any of the conventional forms of this well known circuit mounting device. The printed circuit board 2 serves as mounting means for the electronic thermostat and heater control circuit as shown in FIG. 4 in addition to the indicator drum 8 and the potentiometer means 10, which as shall be seen hereinafter, is the control element for setting the temperature of the electronic thermostat and heater control circuit illustrated in FIG. 4. LED 12 is also mounted on the printed circuit board and, as shall be further described in connection with FIG. 4, is illuminated whenever the electric resistance heater means 14 is energized.

The printed circuit board 2 has a width which conveniently fits within glass tube within which the entire apparatus illustrated in FIG. 1 is mounted. Such a glass tube 68 typically may be opened at both ends, have a length which varies as a function of the wattage associated with the embodiment of the invention configured and an outside diameter which may be of the order of 21.25 millimeters with a wall thickness of the order of 2.1 millimeters. This glass tube 68 is preferably formed of glass having a low-coefficient of thermal expansion such as borosilicate glass or alternatively, Pyrex may be used. Although specific types of glass and exemplary thicknesses therefor have been set forth, this may obviously be varied to meet specific design parameters or imposed mechanical or thermal standards. For example thicker or thinner glass tubes may be employed or alternately a pair of tubes of differing diameter may be concentrically disposed so as to provide two layers of insulation. An alternative system used to meet the electrical requirements of some countries involving filling the space between the outer tube and the electric resistance heater means 14 with a suitable electrically insulating material such as aluminum oxide. This material preferably also exhibits good thermal conductivity.

The printed circuit board 2 is mounted between first and second printed circuit board locators 4 and 6 which act in the conventional manner to securely mount the printed circuit board 2 and locate the same in the thermostatic heater apparatus assembly configured. This location may be central or off center to accommodate components thereon, such as potentiometer 10. The details of the first and second printed circuit board locators 4 and 6 will be best appreciated by reference to FIG. 3A; however, here it is sufficient to appreciate that the maximum diameter of each of the first and second printed circuit board locators 4 and 6 should closely approach the inside diameter of the glass tube in which the thermostatic heater apparatus assembly is mounted and should be slightly tapered, as indicated, to accommodate the full width of the printed circuit board 2.

As best shown in FIGS 3A and 3B the first and second printed circuit board locators 4 and 6 are provided with receiving members 20, 22 and 24, 26, respectively to form a slot 23 and 25, respectively therebetween for receiving the printed circuit board 2 and holding the same firmly positioned within the glass tube 68. The first printed circuit board locator 4 as best shown in FIGS. 3A and 3B is provided with a centering post 28 and integral cable clamp 30 to enable the first printed circuit board locator 4 to be approximately positioned and spaced with respect to the sealing bung means 18 and to receive and supply a conventional power cord 32 to the printed circuit board 2. The centering post 28 could be replaced by two or more spigots. A centering post 29 is also affixed to or may be part of the electric resistance heater means 14 for mounting the sealing bung 16. Sealing bung 18 has an opening 9 to receive a screw driver slot end 50 of drum 8 therethrough and an opening 31 for power cord 32.

The integral cable clamp 30 prevents, as will be appreciated by those of ordinary skill in the art, a condition being imposed on the power cord 32 which might cause the same to be pulled away from the printed circuit board 2. In addition, as also best shown in FIG. 3A, the first printed circuit board locator 4 is provided with an aperture 34 for accommodating the indicator drum 8 therethrough so as to allow the same to be freely rotated yet snugly supported for rotation. The first and second PCB locators 4 and 6 may be formed of plastic, rubber or similar other materials.

The second printed circuit board locator 6 is configured similarly to the first printed circuit board locator 4 in that the same has a diameter which corresponding closely to the inside diameter of the glass tube in which the thermostatic heater apparatus is to be mounted and is provided with first 24 and second 26 receiving members forming slot 25 for receiving and mounting the printed circuit board 2. The second printed circuit board locator 6 is provided with a pair of apertures (not shown) to accept connection prongs 40 and 42 made of nickel tape or other fairly stiff material which are fixed sufficiently firmly into electric heater resistance means 14 to act as a support for electric heater resistance means 14 when the connection prongs 40 and 42 are inserted into the apertures in printed circuit board locator 6. The second printed circuit board locator 6 may be provided with a second barrier, not shown, to take up the internal diameter of the tube to reduce heat transfer between the heater end and end portion of the thermostat. Printed circuit board 2 has two conducting areas 36 and 38 so located that when pushed between members 24 and 26 of printed circuit board locator 6 connection is made with the connection prongs 40 and 42 which may also be soldered to the connection pads 36 and 38 on printed circuit board 2 if necessary.

The printed circuit board 2 also has mounted thereon the indicator drum 8, potentiometer means 10 and LED 12. The indicator drum 8 as best shown in FIG. 3A is provided with a flat tip 48 and a screw driver slot end 50 in the shape of the aforementioned screw head or the like. The flat tip 48 as shown in FIG. 3A is configured to engage an adjustment slot 52 of the potentiometer means 10 so that, as shall be seen in greater detail in connection with FIG. 4, the temperature setting of the electronic thermostat and heater control shown in FIG. 4 may be set to different temperatures. To this end the indicator drum 8 is rotationally mounted as indicated in FIG. 3A to the printed circuit board 2 by virtue of the insertion of the flat tip 48 into the slot 52 and a portion of the barrel of the indicator drum through the aperture 34 in the first printed circuit board locator 4. In addition, as shall be appreciated by those of ordinary skill in the art, the screw driver slot end 50 forms a push fit through the sealing bung 18 exposing the adjustment slot at the sealing bung 18 in the manner illustrated in FIG. 1 and forming a waterproof seal around a shaft 54. For this purpose O-rings of the like, not shown, may be provided on shaft 54 although, a push fit through the sealing bung 18 which is sufficiently tight to form a waterproof fit about the shaft 54 yet allowing for easy rotation of the shaft for adjustment is readily available. Shaft 54 is also push fit in an opening 55 in drum 8 as shown in FIG. 3A. This avoids the possibility of damage to potentiometer 10 by the application of too much torque to screw driver slot end 50. Alternatively screw driver slot end 50 could be replaced by a hexagonal, Phillips or star type head.

As also shown in FIGS. 1 and 3A the indicator drum 8 is provided with a series of temperature indicia 56 which can take the staircase arrangement of rectangular' indicia and pointer triangles shown in FIG. 3A. The purpose of the indicia 56 is to indicate a temperature selected by the rotation of the indicator drum 8. As will be readily appreciated upon an inspection of FIG. 2 depending upon the degree of the rotation of the indicator drum 8 one of the rectangles of temperature indicia 56 along with its associated pointer triangle will be displayed through the window 60 in the mask which may be painted or otherwise overlaid as detail on the glass tube 68 shown in FIG. 2. Numerical indicia 56 as shown in FIG. 2 may also be arranged in a row and having associated pointers (only one pointer is shown) to display actual temperatures corresponding to the appearance of one of the rectangular temperature indicia 56 at a particular location within the window 60. Thus, the indicator drum 8 serves the dual function of providing a visual display as to the temperature selected upon the rotation of the indicator drum 8 and the same rotation acts through the cooperation of the flat tip 48 and the adjustment slot 52 in the potentiometer means 10 to adjust the temperature setting of the electronic thermostat and heater control mounted on the printed circuit board 2.

The potentiometer means 10 as shall be described in greater detail in connection with FIG. 4 may take the conventional form of a trim potentiometer having an adjustment slot 52. The indicator drum 8 is provided with a flat tip portion 48 for cooperation with adjustment slot 52. The indicator drums 8 or at least the flat tip portion 48 thereof preferably is made of an insulating material such as plastic. Additionally disposed on the printed circuit board 2 is the LED 12. The LED 12 may take any of the conventional forms of light emitting diodes well known to those of ordinary skill in the art. Alternatively, as shall be apparent upon an inspection of FIG. 4, the LED 12 may be replaced by a lamp or other appropriate form of indicator means. The function of the LED 12 is to visually display a condition where the thermostatic heater apparatus according to the instant invention is active or more particularly where the electric resistance means 14 is energized by the electronic thermostat mounted on the printed circuit board 2. For this reason, as indicated in FIG. 2, the glass tube in which the instant invention resides is masked to have an opening 12a provided so that the condition of LED 12 may be observed.

The electric resistance heater means 14, as shown in FIGS. 1 and 3A may take any of the conventional forms of electric resistance heaters well known to those of ordinary skill in the art. Thus, a ceramic or glass former may be employed with resistance wire 64 wound thereon in either straight lengths or as a coil sitting in a threaded groove. Alternatively, a wire wound heating element sitting in a longitudinal groove may be utilized. Connection lugs 40 and 42 for the resistance wire 64 are provided as shown for interconnection to pads 36 and 38 so that the same may be energized by the electronic thermostat and heater control circuit mounted on the printed circuit board. 2. Connection lugs 40 and 42 are held by friction in the two holes in the ceramic former 62 or in the printed circuit board locator 6 situated away from the center of electric heater resistance means 14 sufficiently firmly so as to provide support for the former. These lugs are so formed by connection to resistance wire 64. Connection lugs 40 and 42 are in contact with pads 36 and 38 on printed circuit board 2 so that the resistance wire 64 may be energized by the electronic thermostat and heater control circuit mounted on printed circuit board 2. The ceramic or glass former 62 may be provided with an aperture 46, as aforesaid, for mating with a centering post 44 on the second printed circuit board locator 6 and a centering post 29 for mating with an aperture in sealing bung 16. The ceramic or glass former is preferably shaped so that when it is inserted in the glass tube 68 scratching of the tube can not occur.

The sealing bungs 16 and 18 may be made of conventional plastic, vinyl or rubberized material having the shape illustrated in FIGS. 1 and 3A. In the case of the sealing bung 18 cylindrical and/or oval openings 9, 31 are provided therein for both the screw driver slot end portion 50 of the indicator drum 8 and the power cord 32 so that both may be push fit through in such a manner that the sealing bung forms a waterproof seal around both the shaft 54 and the power cord 32. To this end O-rings or sections thereof may be applied internally in the cylindrical openings of the sealing bung 18. The sealing bung 18 is also provided with an opening (not shown) for accepting the centering post 28 on the first printed circuit board locator 4.

The second sealing bung 16 is provided for mounting over an end portion of the glass tube 68. Both the sealing bungs 18 and 16 are permanently secured to the inside of the glass tube 68 by use of an adhesive or other sealing techniques so that a waterproof fitting is provided. Alternatively, a pressure fit may be utilized and O-rings or the like may be incorporated to improve seal. Use of a force fit where safety regulations allow is advantageous in that the same permits the disassembly of the resulting apparatus for maintenance purposes or the like. While not shown in the figures the sealing bungs 18 and 16 for the glass tube 68 per se may have mountings for suction cups or the like so that the same may be secured to the side and/or bottom of an aquarium in which the same is utilized. The glass tube 68 may be formed of borosilicate glass or Pyrex, as aforesaid, and would typically have an outside diameter of 21.25 mm and a wall thickness of the order of 2.1 mm or the like as aforesaid. The length of the glass tubes selected would typically vary as a function of the power rating of the electrical resistance heater means 14 employed wherein typical power ratings would range from approximately 75 to 300 hundred watts. Hence the length of the glass tube might typically vary from 230 mm through 400 mm to accommodate heater element former sizes ranging from 50 mm to 200 mm. Longer tubes should be used for higher wattage.

Referring now to FIG. 4 there is shown a schematic of an exemplary embodiment of an electronic thermostat and heater control circuit for the embodiment of the thermostatic heater apparatus illustrated in FIG. 1. The electronic thermostat and heater control circuit illustrated in FIG. 4 comprises a thermistor 80, a comparator 82, a thyristor 84 as well as the potentiometer means 10, LED 12, and the electric resistance heater means 64 discussed in connection with FIG. 1.

The thermistor 80 may take the conventional form of a 2322-642-62333 thermistor element as available from Phillips Corporation or the equivalent thereof. The thermistor element 80 acts to sense temperature and is connected through a resistor 86 to form a potential divider across the power supply indicated by the annotation "+30 V". The output of the thermistor 80 as produced at the junction with resistor 86 provides on input (+in) to the comparator 82. The comparator 82 may take the conventional form of a dual comparator chip such as an LM393N or the equivalent as available from Motorola Corporation, Phillips Corporation and several other manufacturers. The dual comparator acts in the conventional manner to produce a high at the outputs thereof connected to conductors 88 and 90 when the magnitude of inputs applied to the +in inputs thereof on conductors 92 and 94 exceed the reference value supplied to the other (−in) inputs thereto provided on conductors 96 and 98. The reference inputs supplied to the comparator 82 on conductors 96 and 98 are established by the setting of the potentiometer means 01 which preferably takes the form of vertical trim potentiometer which is both small in size and exhibits cermet construction i.e. a metal film on a ceramic base. This preference in design is indicated as the construction is more reliable and less prone to moisture problems then for example, a carbon film potentiometer on an SRBP base. A suitable potentiometer means 10 may comprise a 6 mm vertical trim pot as available from Bourns or Bicc Citec. The potentiometer means 10 is connected across the +30 V through voltage dividing resistors 100 and 102 which are typically ¼ watt resistors. One output of the comparator 82 is fedback through a resistor 104 to the +in inputs to the comparator 82 on conductors 92 and 94 while the second output thereof on conductor 90 is applied to the gate of the thyristor 84.

The output of the comparator 82 on conductor 88 is supplied through a positive feedback resistor 104 to conductors 92 and 94 which are connected between the thermistor 80 and the resistor 86. This junction is also connected through a capacitor 106 to the output of the potentiometer means 10, the capacitor 106 is used across the signal inputs to eliminate noise. The positive feedback associated with the resistor 104 is employed to provide the circuit with hysterisis so that switching is fast and positive.

The output from the comparator 82 on conductor 90 applied to the gate of the thryistor 84 is also connected as indicated to a pull up resistor 108 and acts in the well known manner to control the gate of the thyristor 84. A current limiting resistor 110 is used in series with the LED 12. The thyristor 84 may take any of the conventional forms of this well known class of device such as is available from Motorola Corporation or Texas Instruments. Different values or devices having different suffixes may be employed for 240 volt and 110 volt applications.

In operation, the thermistor 80 senses temperature and acts in concert with the resistor 86 to form a potential divider across the power supply represented by the indication +30 V. As temperature increases the signal voltage at the junction between the thermistor 80 and the resistor 86 decreases. This causes the input to the comparator 82 on conductors 92 and 94 to decrease as temperature increases. When the signal decreases below the reference signal generated by the adjustable potentiometer divider formed by the potentiometer 10 and resistors 100 and 102, the output on the conductor 90 will cause the thryistor 84 to be gated off. When the sensed temperature is below the set temperature established by the potentiometer 10, the input on conductors 92 and 94 is above the input on the conductors 96 and 98 and the output of the comparator 82 on conductors 88 and 90 is high which allows the thyristor 84 to conduct and energize the electrical resistance heater means 14. This will also cause the LED 12 to be illuminated.

When the temperature increases such that the signal output by the thermistor 80 on conductors 92 and 94 is below the signal on the conductors 96 and 98 the output on the conductor 90 goes low, the thyristor 84 ceases to conduct and the heater element 64 and the LED 12 are de-energized.

The power supply, as indicated, is taken directly from the AC mains. A voltage drop is provided by resistor 112 and a single diode 114 provide half wave rectification. Smoothing is provided by a capacitor 116 which may take the form of a 10 microfarad electrolytic capacitor and voltage limiting is provided by a zener diode 118 which may have a 30 volt zener rating or the like. The zener diode 118 may be omitted, where it is anticipated that use will occur in countries having an extremely stable mains voltage.

Failsafe operation is provided in the event of failure of the potentiometer 10 and assumes that failure will take the form of breakdown of the potentiometer 10. This will most likely occur due to a disconnection of the wiper of the potentiometer 10 from the track due to corrosion or moisture. When this occurs there will be no control of the input to the comparator on conductors 96 and 98 which allows the −in input to the comparator 82 to go high turning the thyristor 84 and the heater element 64 off.

The electric thermostat and heater control circuit illustrated in FIG. 4 exhibits a number of advantageous attributes. For example, zero crossing switching takes place due to the manner of operation of the thyristor. This assures no radio interference or the like results. In addition the thyristor 84 is used in a burst fire mode so that the input voltage is switched on and off fully avoiding problems with RFI typically found in circuits such as light dimmer switches and the like. Further, the hysteresis employed means that the mains are switched very quickly and contact bounce often associated with bimetallic thermostats is avoided. Finally, very low current is utilized and this avoids the need for large power supplies. In this regard, the thyristor typically uses 0.2 mA gate current to control the mains and the voltage comparator 82 typically requires a very low supply current on the order of 0.7 mA.

Although the instant invention has been described in connection with a highly specific exemplary embodiment thereof, it will be understood that many modifications and variations will be readily apparent to those of ordinary skill in the art. For example, while not illustrated, suction cups or the like may be connected to the sealing bungs to enable the submersible thermostat heater apparatus to be affixed to the side of the task. Therefore, it is manifestly intended that this invention only be limited by the claims and the equivalents thereof.

What is claimed is:

1. Thermostatic heater apparatus comprising:

electric resistance heater means;
mounting means;
electronic thermostat means mounted on said mounting means for generating an energizing signal whenever temperature sensed thereby falls below a selected temperature setting, said electronic thermostat means including means for sensing temperature, adjustable means for establishing a selected temperature setting, and switch means responsive to said signal for energizing said electric resistance heater means;
temperature setting means having a plurality of temperature indicia thereon for indicating temperature selected, said temperature setting means being mounted for movement with respect to said mounting means and cooperatively connected to said means for establishing a temperature setting, said temperature setting means being configured in such manner that the movement thereof causes predetermined ones of said temperature indicia to be displayed and said means for establishing to establish a temperature setting corresponding to that displayed;
means for interconnecting said electric resistance heater means and said switch means;
a waterproof envelope surrounding said mounting means, said electronic thermostat means, said temperature setting means, said electric resistance heater means and said means for interconnecting;
said electric resistance heater means including an axially disposed former;
said waterproof envelope including a tube having open ends, and first and second bung means for sealing each end of said tube; and
first and second locator means, each of said first and second locator means including means for receiving and retaining said mounting means and annular spacer means for positioning said mounting means within said tube;
said first and second locator means each including centering post means, said centering post means on said first locator means being insertable within one of said sealing bung means to position said mounting means with respect thereto and said centering post means on said second locator means being fixed in position with respect to said axially disposed former to position said axially disposed former with respect to said mounting means.

2. The thermostatic heater apparatus according to claim 1, wherein said means for sensing temperature comprises thermistor means.

3. The thermostatic heater apparatus according to claim 2, wherein said adjustable means for establishing a selected temperature setting comprises settable potentiometer means.

4. The thermostatic heater apparatus according to claim 3, wherein said switch means includes at least one gate electrode.

5. The thermostatic heater apparatus according to claim 4, wherein said mounting means is in the form of printed circuit board means.

6. The thermostatic heater apparatus according to claim 3, wherein said temperature setting means is mounted for rotation on said mounting means.

7. The thermostatic heater apparatus according to claim 6, wherein said means for interconnecting connects said electric resistance heater means and said switch means in an axial direction parallel to said axially disposed former.

8. The thermostatic heater apparatus according to claim 7, wherein said tube is a glass tube.

9. The thermostatic heater apparatus according to claim 7, wherein at least one of said sealing bung means includes means adapted to receive a power cord therethrough and means for allowing rotation of said temperature setting means.

10. The thermostatic heater apparatus according to claim 9, wherein said first locator means includes clamp means adapted to clamp an end of the power cord.

11. The thermostatic heater apparatus according to claim 7, wherein said electronic thermostat means includes visual indicator means, said visual indicator means being mounted on said mounting means and connected in said electronic thermostat means to be energized by said switch means when said electric resistance heater means is energized.

12. The thermostatic heater apparatus according to claim 7, wherein said mounting means includes lug means and said second locator means includes aperture means for connecting said lug means to said electric resistance heater means through said second locator means.

13. The thermostatic heater apparatus according to claim 7, wherein said switch means comprises thyristor means having at least a gate electrode.

14. The thermostatic heater apparatus according to claim 13, wherein said electronic thermostat means includes comparator means interconnected between said thermistor means and said thyristor means, said comparator means enabling said gate electrode of said thyristor means when said temperature sensed by said thermistor means is below said selected temperature setting established by said potentiometer means.

* * * * *